(12) United States Patent
Park et al.

(10) Patent No.: US 12,439,501 B2
(45) Date of Patent: Oct. 7, 2025

(54) UWB ANTENNA INTEGRATED LAMP ASSEMBLY WITHOUT EMI NOISE

(71) Applicant: GM Global Technology Operations LLC, Detroit, MI (US)

(72) Inventors: Jonglee Park, Novi, MI (US); Jang Hwan Oh, Troy, MI (US); Daniel Pinheiro Carlesimo, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 112 days.

(21) Appl. No.: 18/393,120

(22) Filed: Dec. 21, 2023

(65) Prior Publication Data

US 2025/0212307 A1    Jun. 26, 2025

(51) Int. Cl.
*H05B 47/19*    (2020.01)
*B60Q 1/04*    (2006.01)
*B60Q 1/30*    (2006.01)

(52) U.S. Cl.
CPC .............. *H05B 47/19* (2020.01); *B60Q 1/04* (2013.01); *B60Q 1/30* (2013.01)

(58) Field of Classification Search
CPC ............. B60Q 1/04; B60Q 1/30; H05B 47/19
See application file for complete search history.

(56) References Cited

U.S. PATENT DOCUMENTS

| 5,963,172 A | 10/1999 | Pfizenmaier et al. |
| 9,244,442 B2* | 1/2016 | Jansseune .............. B60R 25/24 |
| 2017/0232930 A1* | 8/2017 | Murar ................... B60Q 5/005 |
| | | 340/5.61 |
| 2025/0175494 A1* | 5/2025 | Nekoui .............. H04W 12/122 |

FOREIGN PATENT DOCUMENTS

| DE | 10024666 A1 | 11/2001 |
| DE | 102009040326 A1 | 3/2011 |
| DE | 102016007410 A1 | 12/2016 |

* cited by examiner

*Primary Examiner* — Raymond R Chai
(74) *Attorney, Agent, or Firm* — Honigman LLP; Matthew H. Szalach; Jonathan P. O'Brien

(57) ABSTRACT

A method includes energizing a light source of a vehicular lamp assembly according to a duty cycle. The light source emits light responsive to being energized. While energizing the light source, and during an off-cycle of the duty cycle, the method includes transmitting an outgoing short-range wireless communication to a user device. The outgoing short-range wireless communication is transmitted from an antenna at the vehicular lamp assembly. During the off-cycle of the duty cycle, the method includes receiving an incoming short-range wireless communication at the antenna at the vehicular lamp assembly. The incoming short-range wireless communication is transmitted from the user device responsive to the outgoing short-range wireless communication.

20 Claims, 9 Drawing Sheets

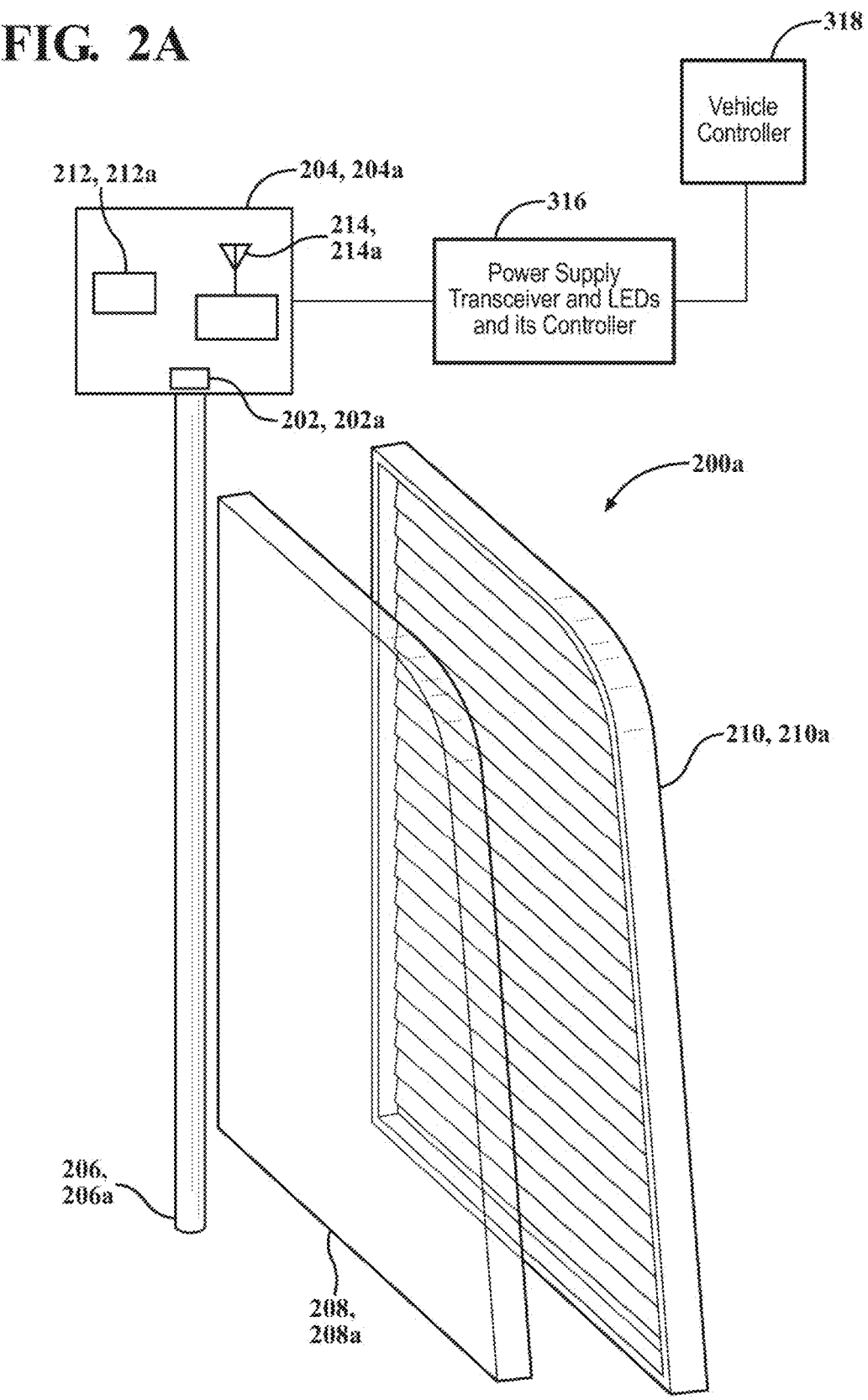

UWB ANTENNA INTEGRATED LAMP ASSEMBLY WITHOUT EMI NOISE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a short-range wireless communication antenna at a vehicular lamp assembly, and more specifically to controlling operation of the antenna to transmit and receive wireless communications at the antenna and controlling operation of the lamp assembly to emit light from the lamp assembly without electromagnetic interference (EMI) from the lamp assembly affecting wireless communications at the antenna.

Vehicles are commonly equipped with short-range wireless communication antennae configured to communicate with devices remote from the vehicle via short-range wireless communication protocols, such as via Bluetooth®, Wi-Fi®, low frequency (LF), and ultra-wide band (UWB) technologies. For example, the vehicle communicates with a key fob associated with the vehicle via the short-range wireless communications to determine presence of the key fob at or near the vehicle. Traditionally, these antennae are positioned about the vehicle in a variety of positions to increase likelihood that the key fob will be detected, such as in the door handles of the vehicle. However, this increases complexity of the vehicle wire harness, and increases materials and maintenance requirements. Further, packaging of the antennae and related electronics within vehicle structures presents a significant challenge.

To allow the vehicle to more reliably communicate with devices remote from the vehicle via short-range wireless communication protocols by packaging antennae and related electronics at optimal positions about the vehicle, and to reduce wire harness complexity, a short-range wireless antenna is positioned at or near one or more lamp assemblies of the vehicle. As a mounting location, the lamp assembly allows the antennae to have a more continuous range of sensing around the vehicle. However, when the lamp assembly is electrically operated to emit light, EMI from the lamp assembly may interfere with communication to and from the antenna.

SUMMARY

One aspect of the disclosure provides a computer-implemented method executed by data processing hardware that causes the data processing hardware to perform operations. The operations include energizing a light source of a vehicular lamp assembly according to a duty cycle. The light source emits light responsive to being energized. While energizing the light source, and during an off-cycle of the duty cycle, the operations include transmitting an outgoing short-range wireless communication to a user device. The outgoing short-range wireless communication is transmitted from an antenna at the vehicular lamp assembly. During the off-cycle of the duty cycle, the operations include receiving an incoming short-range wireless communication at the antenna at the vehicular lamp assembly. The incoming short-range wireless communication is transmitted from the user device responsive to the outgoing short-range wireless communication.

Implementations of the disclosure may include one or more of the following optional features. In some implementations, the operations further include, while energizing the light source, adjusting the duty cycle from a first duty cycle to a zero (0) percent duty cycle. In those implementations, transmitting the first short-range wireless communication and receiving the second short-range wireless communication occurs during the zero (0)) percent duty cycle of the duty cycle. In further implementations, the operations further include, responsive to receiving the incoming short-range wireless communication, adjusting the duty cycle to the first duty cycle.

In some examples, energizing the light source of the vehicular lamp assembly is responsive to determining presence of the user device at a distance from the vehicular lamp assembly that is less than a first threshold distance. In further examples, transmitting the outgoing short-range wireless communication to the user device is responsive to determining presence of the user device at a distance from the vehicular lamp assembly that is less than a second threshold distance. The second threshold distance is less than the first threshold distance.

In some aspects, the light source includes a light emitting diode (LED) disposed on a circuit element. In further aspects, the antenna is disposed on the circuit element.

In some implementations, the antenna includes a conductive trace disposed at one selected from the group consisting of (i) a light guide of the vehicular lamp assembly, (ii) a reflector of the vehicular lamp assembly, (iii) a housing of the vehicular lamp assembly, and (iv) a bezel of the vehicular lamp assembly. In further implementations, at least a portion of the conductive trace forms a graphical design at the light guide or the reflector of the vehicular lamp assembly.

In some examples, the outgoing short-range wireless communication and the incoming short-range wireless communication include ultra-wideband (UWB) communications.

Another aspect of the disclosure provides a system including data processing hardware and memory hardware in communication with the data processing hardware. The memory hardware stores instructions that, when executed on the data processing hardware, cause the data processing hardware to perform operations. The operations include energizing a light source of a vehicular lamp assembly according to a duty cycle. The light source emits light responsive to being energized. While energizing the light source, and during an off-cycle of the duty cycle, the operations include transmitting an outgoing short-range wireless communication to a user device. The outgoing short-range wireless communication is transmitted from an antenna at the vehicular lamp assembly. During the off-cycle of the duty cycle, the operations include receiving an incoming short-range wireless communication at the antenna at the vehicular lamp assembly. The incoming short-range wireless communication is transmitted from the user device responsive to the outgoing short-range wireless communication. Aspects of the invention may include one or more of the following optional features.

In some implementations, the operations further include, while energizing the light source, adjusting the duty cycle from a first duty cycle to a zero (0) percent duty cycle. In those implementations, transmitting the first short-range wireless communication and receiving the second short-range wireless communication occurs during the zero (0) percent duty cycle of the duty cycle.

In some examples, energizing the light source of the vehicular lamp assembly is responsive to determining presence of the user device at a distance from the vehicular lamp assembly that is less than a first threshold distance. In those examples, transmitting the outgoing short-range wireless communication to the user device is responsive to determining presence of the user device at a distance from the vehicular lamp assembly that is less than a second threshold distance. The second threshold distance is less than the first threshold distance.

In some aspects, the light source includes a light emitting diode (LED) disposed on a circuit element. The antenna is disposed on the circuit element.

In some implementations, the antenna includes a conductive trace disposed at one selected from the group consisting of (i) a light guide of the vehicular lamp assembly, (ii) a reflector of the vehicular lamp assembly. (iii) a housing of the vehicular lamp assembly, and (iv) a bezel of the vehicular lamp assembly.

In some examples, the outgoing short-range wireless communication and the incoming short-range wireless communication include ultra-wideband (UWB) communications.

Yet another aspect of the disclosure provides a vehicle including a lamp assembly, data processing hardware disposed at the lamp assembly, and memory hardware in communication with the data processing hardware. The lamp assembly includes a light emitting diode (LED) disposed on a circuit element, a light guide, and a reflector. The memory hardware stores instructions that, when executed on the data processing hardware, cause the data processing hardware to perform operations. The operations include energizing the light source of the lamp assembly according to a duty cycle. The light source emits light responsive to being energized. While energizing the light source, and during an off-cycle of the duty cycle, the operations include transmitting an outgoing ultra-wideband (UWB) wireless communication to a user device. The outgoing UWB wireless communication is transmitted from an antenna at the lamp assembly. During the off-cycle of the duty cycle, the operations include receiving an incoming UWB wireless communication at the antenna at the lamp assembly. The incoming UWB wireless communication is transmitted from the user device responsive to the outgoing UWB wireless communication. Aspects of the invention may include one or more of the following optional features.

In some implementations, the operations further include, while energizing the light source, adjusting the duty cycle from a first duty cycle to a zero (0) percent duty cycle. In those implementations, transmitting the first UWB wireless communication and receiving the second UWB wireless communication occurs during the zero (0) percent duty cycle of the duty cycle.

In some examples, energizing the light source of the lamp assembly is responsive to determining presence of the user device at a distance from the vehicle that is less than a first threshold distance. In those examples, transmitting the outgoing UWB wireless communication to the user device is responsive to determining presence of the user device at a distance from the vehicle that is less than a second threshold distance. The second threshold distance is less than the first threshold distance.

In some aspects, the antenna includes a conductive trace disposed at one selected from the group consisting of (i) the circuit element, (ii) the light guide, (iii) the reflector, (iv) a housing of the lamp assembly, and (v) a bezel of the lamp assembly.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

The drawings described herein are for illustrative purposes only of selected configurations and are not intended to limit the scope of the present disclosure.

FIG. 2A is a plan view of a lamp assembly having an antenna configured to transmit and receive short-range wireless communications disposed at a circuit element that accommodates the light source of the lamp assembly.

Corresponding reference numerals indicate corresponding parts throughout the drawings.

DETAILED DESCRIPTION

Figure 1:
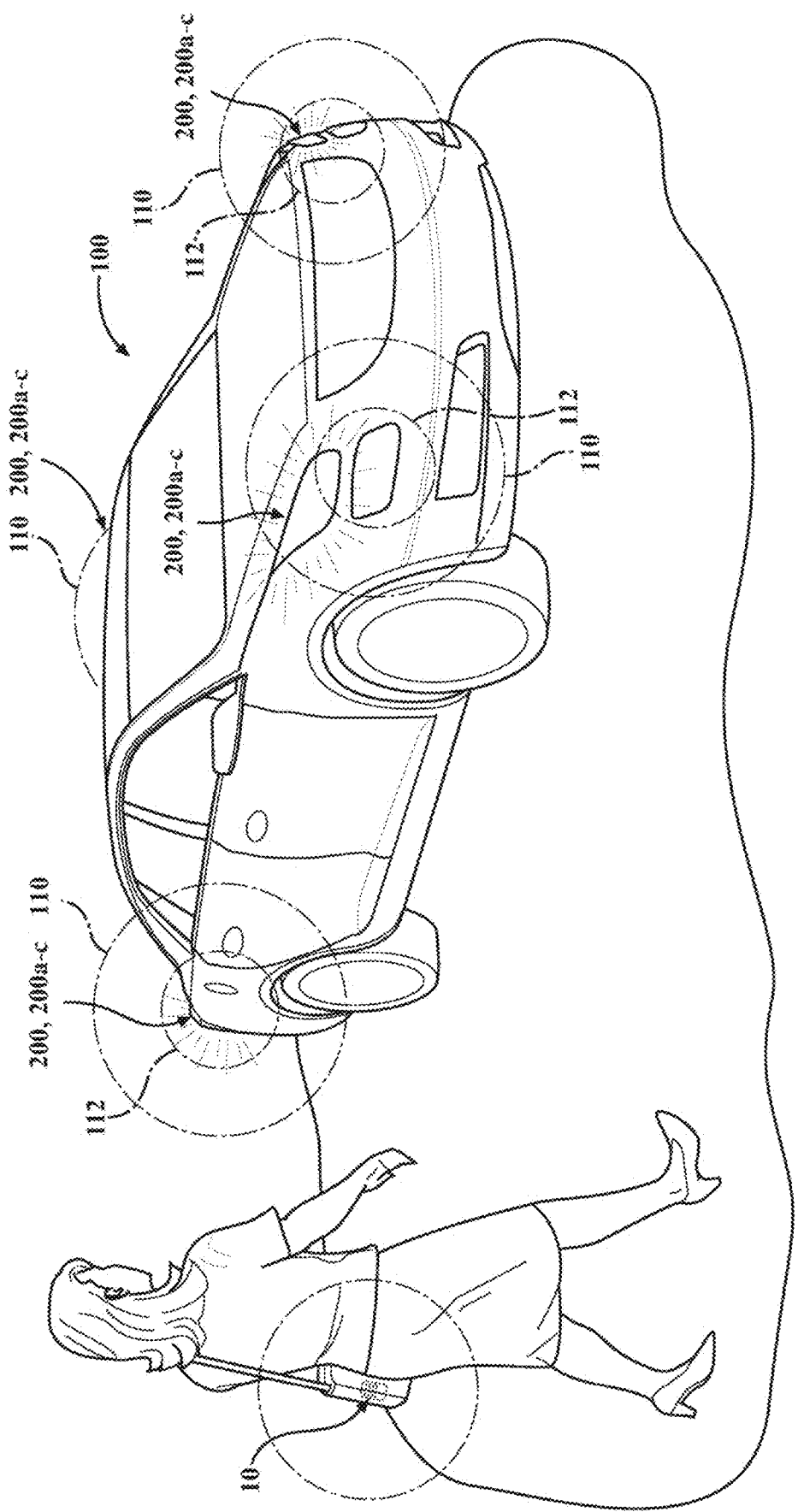
FIG. 1 is a perspective view of a vehicle equipped with lamp assemblies that accommodate respective antennas for transmitting and receiving short-range wireless communications between the vehicle and a user device associated with the vehicle.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising." "including." and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second." "third." etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first." "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC): a digital, analog, or mixed analog/digital discrete circuit: a digital, analog, or mixed analog/digital integrated circuit: a combinational logic circuit: a field programmable gate array (FPGA): a processor (shared, dedicated, or group) that executes code: memory (shared, dedicated, or group) that stores code executed by a processor: other suitable hardware components that provide the described functionality: or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application." an "app." or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory. Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data. e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Referring now to the figures and the illustrated configurations depicted therein, a vehicle 100 communicates with a user device 10, such as a key fob, mobile device, or smart watch, associated with the vehicle 100 (FIG. 1). For example, the vehicle 100 wirelessly communicates with the user device 10 to transmit and receive signals via a short-range wireless communication protocol to determine presence of the user device 10 at or near the vehicle 100. Based on determining presence of the user device 10 at or near the vehicle 100, the vehicle 100 may initiate a welcome sequence (e.g., electrically operate welcome lights at the vehicle 100), allow use of a keyless entry system (e.g., where the vehicle 100 is unlocked based on determining presence of the user device 10 at or near the vehicle 100, such as at or near a door of the vehicle 100 or within a threshold distance of the vehicle 100), and the like. For example, the vehicle 100 communicates with the user device 10 via one or more short-range wireless communication protocols, including Bluetooth®, Bluetooth®; Low Energy (BLE), Wi-Fi®, low frequency (LF), and ultra-wide band (UWB).

Although described herein as utilizing UWB communication protocols, it should be understood that the vehicle 100 may communicate with the user device 10 via one or more suitable short-range wireless communication protocols, such as those listed above. UWB is a short-range wireless communication protocol that uses radio waves at a high bandwidth to improve application possibilities and security levels compared to similar radio technologies. UWB communication provides highly accurate and robust localization within 10 centimeters or less in a multi-path environment, is secure against relay attacks, and provides low latency and high data rates of up to 100 megabits per second or more. Further, UWB communications allow for real time updates with update rates of up to 1,000 times per second or more. To enable UWB communications between the vehicle 100 and the user device 10, one or more UWB transceivers and/or antennae are positioned both at the vehicle 100 and the user device 10.

The vehicle 100 includes one or more lamp assemblies 200, 200a-c that accommodate the transceivers and/or antennas to enable the short-range wireless communications with the user device 10. Because the lamp assemblies 200 are mounted at or near each corner region of the vehicle 100, the lamp assemblies 200 provide a superior position for transmitting and receiving the short-range wireless communications with the user device 10 within a generally continuous region surrounding the vehicle 100. That is, the headlights and taillights may provide the most suitable position for the short-range wireless communication transceiver and/or antenna at the vehicle 100 for communicating with the user device 10. Further, accommodating electronic components to enable the short-range wireless communications at the lamp assembly 200 reduces complexity of the vehicle wire harness, resulting in reduced materials and simpler assembly.

Because short-range wireless communications are often transmitted between the vehicle 100 and the user device 10 during operation of the lamp assembly 200 (such as when the lamp assembly 200 is electrically operated to provide welcome lighting as the user approaches the vehicle 100), electromagnetic interference (EMI) created during operation of the lamp assembly 200 risks causing a communication error between the vehicle 100 and user device 10, such as a block error rate (BLER) increase. In other words, EMI from the light source and/or controller of the lamp assembly 200 can cause communication failures from the short-range wireless communication transceiver and/or antenna at the lamp assembly 200. Thus, and as described further below, operation of the lamp assembly 200 and communication between the vehicle 100 and the user device 10 is synchronized or otherwise controlled relative to one another to provide EMI noise-free, UWB communication between the vehicle 100 and the user device 10. For example, to avoid interference during operation of the lamp assembly 200, the antenna is operated to transmit outgoing short-range wireless transmissions during an off-cycle of the duty cycle powering the lamp assembly 200.

Referring to FIG. 2A, a lamp assembly 200, 200a includes one or more light sources 202, 202a, such as a light emitting diode (LED), disposed at a circuit element such as a printed circuit board (PCB) 204, 204a. The LED 202a, when electrically operated, emits light along a light tube 206, 206a which, in turn, directs the light through a light guide 208, 208a. The lamp assembly 200a may further include a reflector 210, 210a for directing the light from the lamp assembly 200a to illuminate a region at or near the vehicle 100, such as a region forward of the vehicle 100 when the lamp assembly 200a provides a headlight of the vehicle 100. In some examples, the one or more LEDs 202a, the light tube 206a, the light guide 208a, and the reflector 210a are accommodated between a housing and a lens of the lamp assembly 200a (not shown), so that the housing may be mounted at the vehicle 100 and light emitted by the LEDs 202a may be directed along the light tube 206a, through the light guide 208a and directed by the reflector 210a through the lens to illuminate the region near the vehicle 100. The lens may be attached to the housing via a bezel that circumscribes the lens.

In the illustrated example of FIG. 2A, a UWB transceiver 212, 212a and a UWB antenna 214, 214a are disposed at the PCB 204a and are configured to transmit and receive the UWB short-range wireless communications with the user device 10. That is, the UWB transceiver 212a and the UWB antenna 214a are disposed at the PCB 204a that accommodates the LED 202a. Optionally, the UWB transceiver 212a and/or the UWB antenna 214a are disposed at another PCB accommodated by the lamp assembly 200a separate and remote from the LED PCB 204a. The UWB transceiver 212a generates UWB communications that are transmitted from the vehicle 100 via the UWB antenna 214a at the PCB 204a. Further, the antenna 214a receives UWB communications that may be converted to electrical signals via the UWB transceiver 212a. For example, the UWB antenna 214a includes an electric trace or other suitable conductor disposed at the PCB 204a.

The lamp assembly 200a is electrically connected to a power source or power supply 316 at the vehicle 100, such as via connection to the wire harness of the vehicle 100, for energizing the light source 202a and the UWB transceiver 212a at the lamp assembly 200a. Based on electrical signals from the power source 316, the UWB transceiver 212a generates short-range wireless communications that are transmitted from the vehicle 100 via the UWB antenna 214a. A control module or controller 318 of the vehicle 100 controls electrical current from the power supply 316 to the lamp assembly 200a. Thus, when the light source 202a of the lamp assembly 200a is electrically operated to emit light and illuminate the region at or near the vehicle 100, electrical current from the power source 316 is supplied to the LED 202a at the PCB 204a and, when the UWB transceiver 212a is electrically operated to transmit UWB communications via the antenna 214a, electrical current from the power source 316 is supplied to the UWB transceiver 212a at the PCB 204a to generate signals from the antenna 214a at the PCB 204a.

Figure 2B:
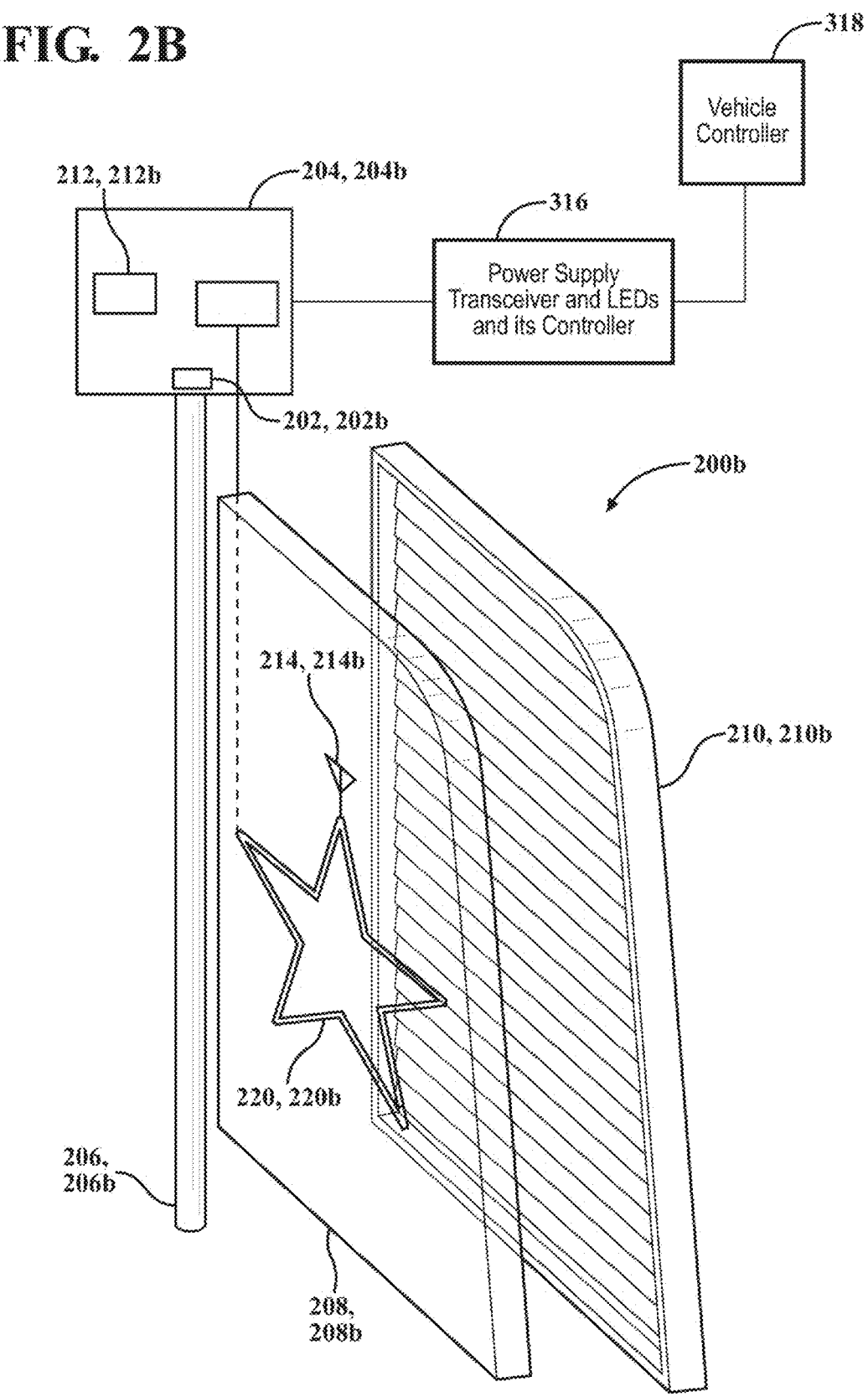
FIG. 2B is a plan view of another lamp assembly having the antenna disposed at a light guide of the lamp assembly.

Referring to FIG. 2B, a lamp assembly 200, 200b includes one or more light sources or LEDs 202, 202b disposed at a circuit element such as a PCB 204, 204b. The LED 202b, when electrically operated, emits light along a light tube 206, 206b which in turn directs the light through a light guide 208, 208b. The lamp assembly 200b further includes a reflector 210, 210b for directing the light from the lamp assembly 200b to illuminate the region at or near the vehicle 100. The lamp assembly 200b may include a housing and a lens (not shown), with the components of the lamp assembly 200b accommodated between the housing and the lens. Thus, the housing may be mounted at the vehicle 100 and light emitted by the LEDs 202b may be directed along the light tube 206b, through the light guide 208b and directed by the reflector 210b through the lens to illuminate the region near the vehicle 100.

In the illustrated example of FIG. 2B, a UWB transceiver 212, 212b is disposed at the PCB 204b while the UWB antenna 214, 214b is disposed at the light guide 208b. The UWB transceiver 212b and the UWB antenna 214b are configured to transmit and receive the UWB short-range wireless communications with the user device 10. That is, the UWB transceiver 212b is disposed at the PCB 204b that accommodates the LED 202b and electrically connected to the UWB antenna 214b that is disposed remote from the PCB 204b and at a surface of the light guide 208b. The UWB transceiver 212b generates UWB communications that are transmitted from the vehicle 100 via the UWB antenna 214b at the light guide 208b. Further, the antenna 214b receives UWB communications that may be converted to electrical signals via the UWB transceiver 212b. For example, the UWB antenna 214b includes a conductive trace or other suitable conductor embedded in or otherwise disposed at a surface of the light guide 208b.

Because the light guide 208b and the electrical trace or conductor of the UWB antenna 214b may be viewable by a person viewing the lamp assembly 200b, the UWB antenna 214b may be stylized or otherwise configured to appear as a pattern, graphical design, icon, logo, wordmark, and the like at the surface of the light guide 208b. A portion of the UWB antenna 214b may include dummy or non-conductive trace 220, 220b so that the conductive portion of the UWB antenna 214b and the non-conductive portion 220b cooperate to form the graphical design without the form or shape of the graphical design affecting the transmitting properties of the UWB antenna 214b.

The lamp assembly 200b is electrically connected to the power source 316 at the vehicle 100 for energizing the light source 202b and the UWB transceiver 212b at the lamp assembly 200b. Based on electrical signals from the power source 316, the UWB transceiver 212b generates short-range wireless communications that are transmitted from the vehicle 100 via the UWB antenna 214b, with the control module 318 of the vehicle 100 controlling electrical current from the power supply 316 to the lamp assembly 200b. Thus, when the light source 202b of the lamp assembly 200b is electrically operated to emit light, electrical current from the power source 316 is supplied to the LED 202b at the PCB 204b and, when the UWB transceiver 212b is electrically operated to transmit UWB communications via the antenna 214b, electrical current from the power source 316 is supplied to the UWB transceiver 212b at the PCB 204b to generate signals from the antenna 214b that is disposed at the light guide 208b.

Figure 2C:
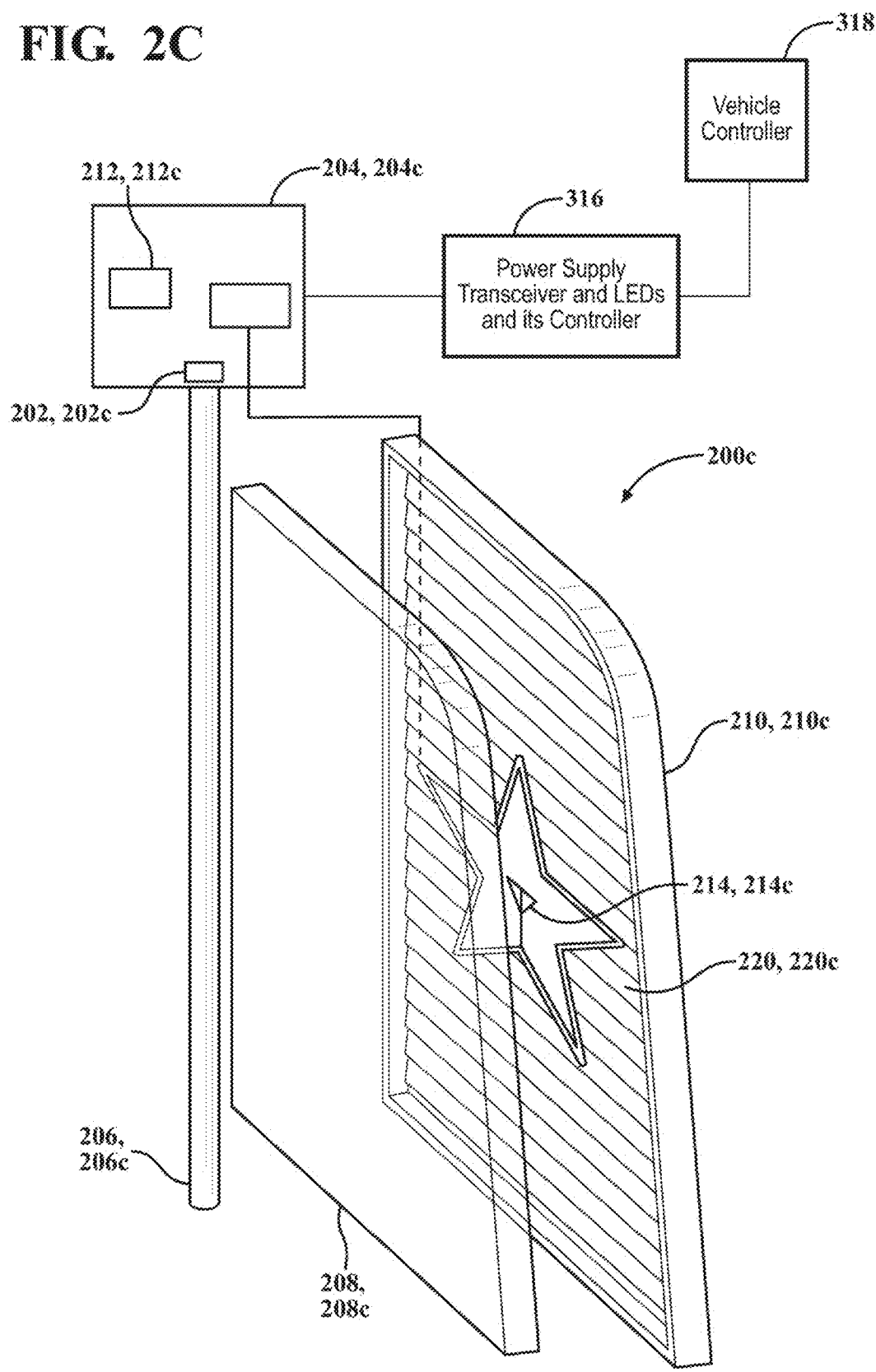
FIG. 2C is a plan view of another lamp assembly having the antenna disposed at a reflector of the lamp assembly.

Referring to FIG. 2C, a lamp assembly 200, 200c includes one or more light sources or LEDs 202, 202c disposed at a circuit element such as a PCB 204, 204c. The LED 202c, when electrically operated, emits light along a light tube 206, 206c which in turn directs the light through a light guide 208, 208c. The lamp assembly 200c further includes a reflector 210, 210c for directing the light from the lamp assembly 200c to illuminate the region at or near the vehicle 100. The lamp assembly 200c may include a housing and a lens (not shown), with the components of the lamp assembly 200c accommodated between the housing and the lens. Thus, the housing may be mounted at the vehicle 100 and light emitted by the LEDs 202c may be directed along the light tube 206c, through the light guide 208c and directed by the reflector 210c through the lens to illuminate the region near the vehicle 100.

In the illustrated example of FIG. 2C, a UWB transceiver 212, 212c is disposed at the PCB 204c while the UWB antenna 214, 214c is disposed at the reflector 210c. The UWB transceiver 212c and the UWB antenna 214c are configured to transmit and receive the UWB short-range wireless communications with the user device 10. That is, the UWB transceiver 212c is disposed at the PCB 204c that accommodates the LED 202c and electrically connected to the UWB antenna 214c that is disposed remote from the PCB 204c and at a surface of the reflector 210c. The UWB transceiver 212c generates UWB communications that are transmitted from the vehicle 100 via the UWB antenna 214c at the reflector 210c. Further, the antenna 214c receives UWB communications that may be converted to electrical signals via the UWB transceiver 212c. For example, the UWB antenna 214c includes a conductive trace or other suitable conductor embedded in or otherwise disposed at a surface of the reflector 210c.

Because the reflector 210c and the electrical trace or conductor of the UWB antenna 214c may be viewable by a person viewing the lamp assembly 200c, the UWB antenna 214c may be stylized or otherwise configured to appear as a pattern, graphical design, icon, logo, wordmark, and the like at the surface of the reflector 210c. A portion of the UWB antenna 214c may include dummy or non-conductive trace 220, 220c so that the conductive portion of the UWB antenna 214c and the non-conductive portion 220c cooperate to form the graphical design without the form or shape of the graphical design affecting the transmitting properties of the UWB antenna 214c.

The lamp assembly 200c is electrically connected to the power source 316 at the vehicle 100 for energizing the light source 202c and the UWB transceiver 212c at the lamp assembly 200b. Based on electrical signals from the power source 316, the UWB transceiver 212c generates short-range wireless communications that are transmitted from the vehicle 100 via the UWB antenna 214c, with the control module 318 of the vehicle 100 controlling electrical current from the power supply 316 to the lamp assembly 200c. Thus, when the light source 202c of the lamp assembly 200c is electrically operated to emit light, electrical current from the power source 316 is supplied to the LED 202c at the PCB 204c and, when the UWB transceiver 212c is electrically operated to transmit UWB communications via the antenna 214c, electrical current from the power source 316 is supplied to the UWB transceiver 212c at the PCB 204c to generate signals from the antenna 214c that is disposed at the reflector 210c.

Thus, the lamp assembly 200 includes the UWB transceiver 212 that generates UWB wireless communications for transmitting from the antenna 214 at the lamp assembly 200. The antenna 214 may be disposed at any suitable position at or near the lamp assembly 200, such as at the PCB 204 that accommodates the LED 202, at the light guide 208, at the reflector 210, at a surface of the housing, at a surface of the lens, and/or at a surface of the bezel of the lamp assembly 200. Installing the antenna 214 at the light guide 208 and/or the reflector 210 may further reduce packaging for the antenna 214 and the controller or transceiver 212. Further, dummy antenna portions or non-conductive portions 220 of the antenna 214 may be disposed at the light guide 208 and/or reflector 210 to stylize the lighting appearance of the light guide 208 and/or reflector 210. Because operation of the light source 202 generates EMI that may affect communications to and from the antenna 214, operation of the light source 202 and the UWB transceiver 212 and/or UWB antenna 214 is controlled by a common control unit 318 of the vehicle 100 to synchronize operation of the light source 202 and UWB antenna 214 to avoid interference with the UWB communications to and from the antenna 214.

Figure 3:
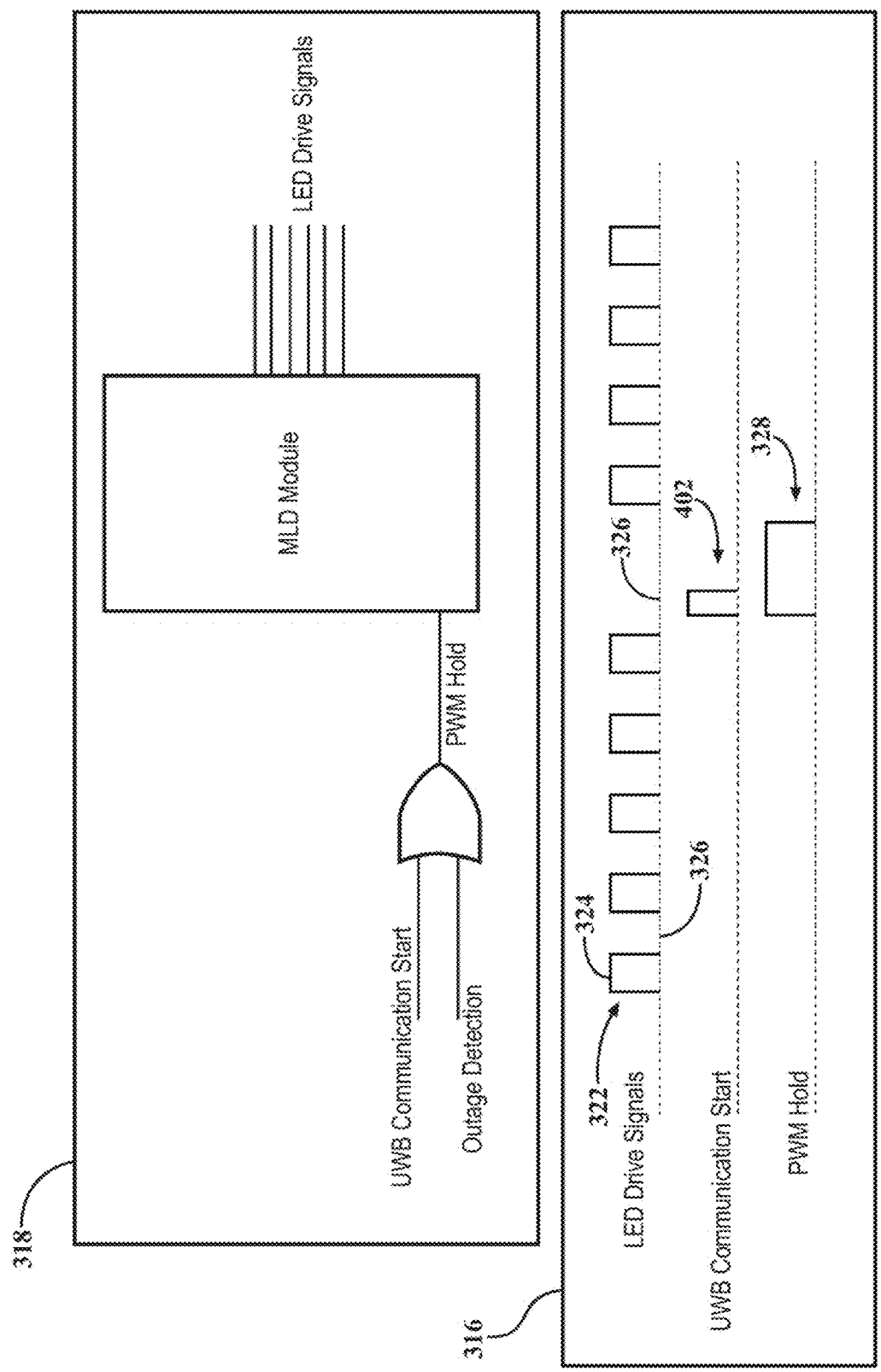
FIG. 3 is a schematic view of the power source and control module that operate the light source and the antenna of the lamp assembly.

Referring to FIG. 3, during operation of the LED 202, the power source 316 drives electrical current to the LED 202 to energize the LED 202 for emitting light from the lamp assembly 200. The light source 202 is energized via pulse-width modulation (PWM), such as minimum loss discontinuous (MLD) PWM, according to a duty cycle 322, where electrical current is driven to the light source 202 during an on-cycle 324 of the duty cycle 322 and electrical current is not driven to the light source 202 during an off-cycle 326 of the duty cycle 322. For example, the light source 202 may be energized by electrical current having a PWM frequency of 100 hertz, 105 hertz, 210 hertz, 420 hertz, and the like, with a duty cycle 322 of zero (0)) percent, between 8 percent and 93 percent. 100 percent, and the like.

When the LED 202 is being energized. EMI noise may interfere with signals from the antenna 214. For example, because UWB communications are generally transmitted between 3 gigahertz, and 5 gigahertz, EMI noise higher than-174 dBm may cause a communication error between the antenna 214 and the user device 10.

To avoid communication errors between the vehicle 100 and the user device 10 during operation of the lamp assembly 200 (such as during illumination of welcome lights), the control module 318 controls the antenna 214 to transmit outgoing UWB wireless communications 402 during an off-cycle 326 of the duty cycle 322 energizing the light source 202. That is, if the LED 202 is energized by electrical current according to a 50 percent duty cycle 322, then the LED 202 emits light responsive to being energized by the 50 percent on-cycle 324 and the antenna 214 transmits the outgoing wireless communications during the 50 percent off-cycle 326. During the off-cycle 326, no EMI noise interferes with communications to and from the antenna 214.

In some examples, and as shown in FIG. 3, the control module 318 may determine or anticipate transmission of the outgoing wireless communication 402 from the vehicle 100. For example, based on initially determining presence of the user device 10 at or near the vehicle 100, the control module 318 may begin tracking position of the user device 10 relative to the vehicle 100 by transmitting outgoing UWB communications 402 to the user device 10 and receiving incoming UWB communications 404 from the user device 10. To accommodate the outgoing UWB communication 402, the control module 318 institutes a PWM hold 328 in the duty cycle 322, the PWM hold 328 causing the duty cycle 322 to adjust to a zero (0) percent duty cycle 322. During the zero (0)) percent duty cycle 322, no EMI noise interferes with the outgoing UWB communication 402 and any incoming UWB communication 404. The control module 318 may release the PWM hold 328 after an incoming UWB communication 404 is received to adjust the duty cycle 322 to the original duty cycle 322 (e.g., 50 percent). Optionally, the PWM hold 328 may adjust only one cycle of the duty cycle 322 to a zero (0) percent duty cycle 322. Thus, any interruption of illumination from the lamp assembly 200 is not visually perceptible. The outgoing UWB communication 402 is synchronized with the duty cycle 322 to be transmitted from the antenna 214 during the off-cycle 326 and/or the PWM hold 328 of the duty cycle 322.

Figure 4:
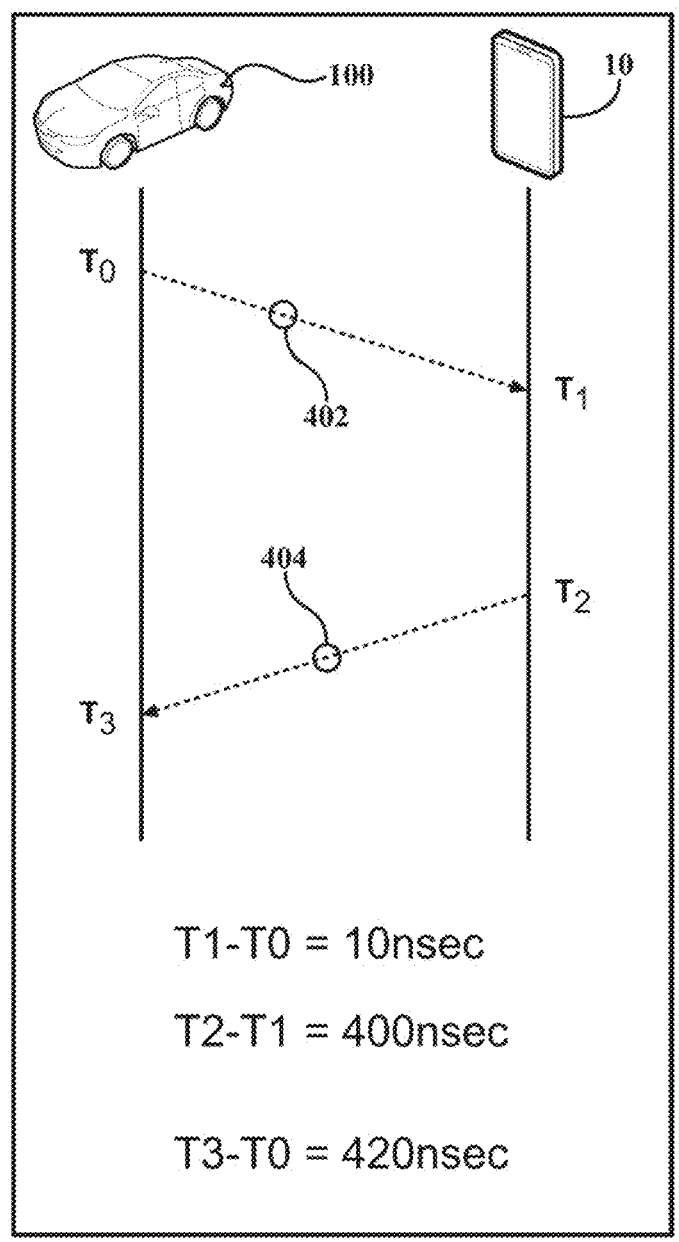
FIG. 4 is a schematic view of short-range wireless communications between the vehicle and the user device.

Referring to FIG. 4, the speed of UWB communication between the vehicle 100 and the user device 10 allows for the outgoing UWB communication 402 to be transmitted from the vehicle 100 to the user device 10 and the incoming UWB communication 404 to be received at the vehicle 100 from the user device 10 within one off-cycle 326 and/or PWM hold 328 of the duty cycle 322. For example, with the user device 10 at 3 meters or less from the vehicle 100, the outgoing UWB communication 402 may take 10 nanoseconds to travel from the vehicle 100 to the user device 10. The user device 10 may take 400 nanoseconds to receive the outgoing communication 402 and to generate the incoming communication 404. The incoming UWB communication 404 may take 10 nanoseconds to travel from the user device 10 to the vehicle 100, such that the total cycle time may take 420 nanoseconds or less. Thus, the EMI noise from operation of the LED 202 does not interfere with transmitting or receiving of UWB communications during the off-cycle 326 and/or PWM hold 328 of the duty cycle 322.

Thus, the control module 318, such as a central controller or electronic control unit (ECU), controls operation of the light source 202 and the UWB transceiver 212 and/or UWB antenna 214 at the lamp assembly 200 to illuminate the region at or near the vehicle 100 and transmit and receive short-range wireless communications to a user device 10 without EMI noise from operation of the light source 202 affecting communications. The control module 318 includes data processing hardware and memory hardware in communication with the data processing hardware. The memory hardware stores instructions that, when executed on the data processing hardware to perform operations. For example, the memory hardware stores instructions for controlling operation of the light source and the UWB antenna simultaneously to avoid EMI noise interfering with operation of the UWB antenna, such as in accordance with the method 700 of FIG. 7 and/or the method 800 of FIG. 8 discussed further below.

Referring to FIG. 1, the control module 318 may control operation of the light source 202 and the antenna 214 at the lamp assemblies 200 as the user device 10 approaches the vehicle 100. For example, the vehicle 100 may passively search for the user device 10 by intermittingly or routinely transmitting short-range wireless communications within a range of the vehicle 100. Based on receiving the short-range wireless communication from the vehicle 100, the user device 10 associated with the vehicle 100 transmits a return communication so that the vehicle 100 may determine presence and/or a relative position of the user device 10 at or near the vehicle 100. Responsive to determining presence of the user device 10 at or near the vehicle 100, the control module 318 may energize the light source 202 (e.g., to initiate a welcome sequence and illuminate the region at or near the vehicle 100) and initiate further outgoing short-range wireless communications 402 from the vehicle 100. In some examples, the vehicle 100 transmits short-range wireless communications via a first protocol (e.g., BLE) when the light sources 202 are not operating and via a second protocol (e.g., UWB) when the light sources 202 are operating.

The vehicle 100 may continue transmitting outgoing short-range wireless communications 402 to the user device 10 during operation of the light sources 202 to track position of the user device 10 relative to the vehicle 100. For example, when the user device 10 is determined to be within a first zone 110 or closer than a first threshold distance (e.g., closer than 20 meters or less, closer than 15 meters or less, closer than 10 meters or less, and the like), the control module 318 may energize the light sources 202 to illuminate the region at or near the vehicle 100 to provide welcome lighting. That is, energizing the light source 202 is responsive to determining presence of the user device 10 at a distance from the vehicle 100 or lamp assembly 200 that is less than the first threshold distance 110. After energizing the light sources 202, the control module 318 may continue tracking the position of the user device 10 using the first protocol (e.g., BLE) and, based on determining presence of the user device 10 within a second zone 112 or closer than a second threshold distance less than the first threshold distance (e.g., closer than 10 meters or less, closer than 5 meters or less, closer than 3 meters or less, and the like), the control module 318 may transmit the outgoing short-range wireless communication 402 via the second protocol (UWB), such as to determine a more precise position of the user device 10 relative to the vehicle 100. The outgoing-short range wireless communication 402 is transmitted from the antenna 214 during the off-cycle 326 of the duty cycle 322 energizing the light source 202.

Figure 5:
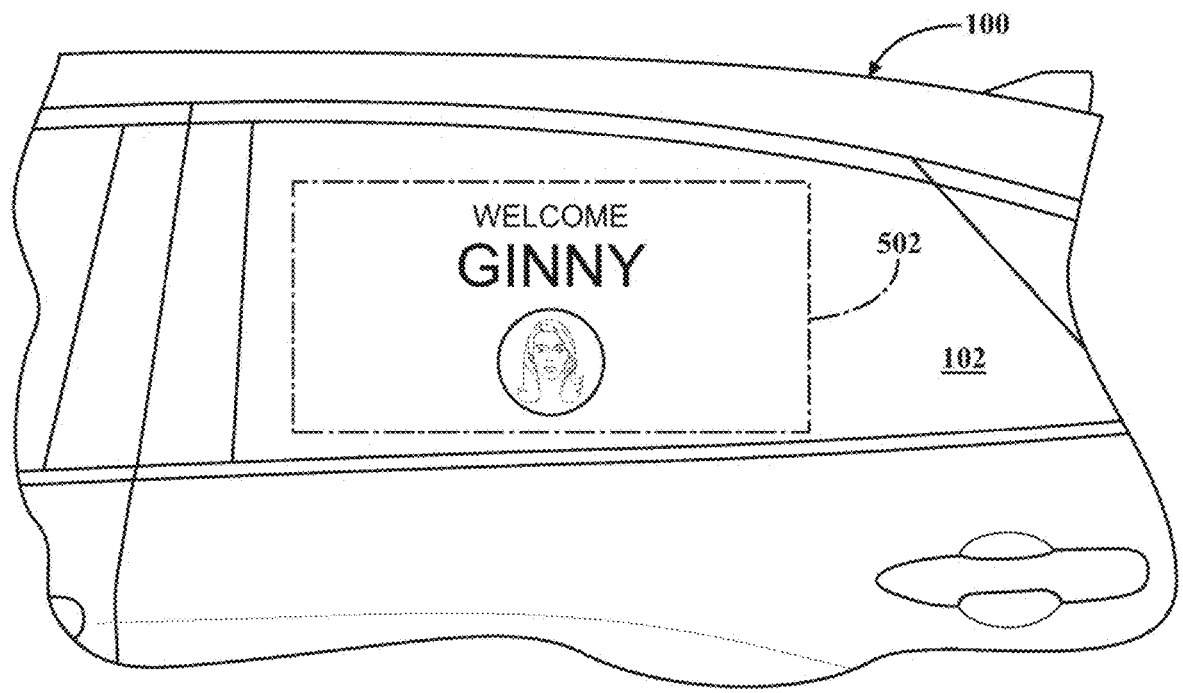
FIG. 5 is an enlarged perspective view of a window of the vehicle with a welcome message projected onto the window.
Figure 6:
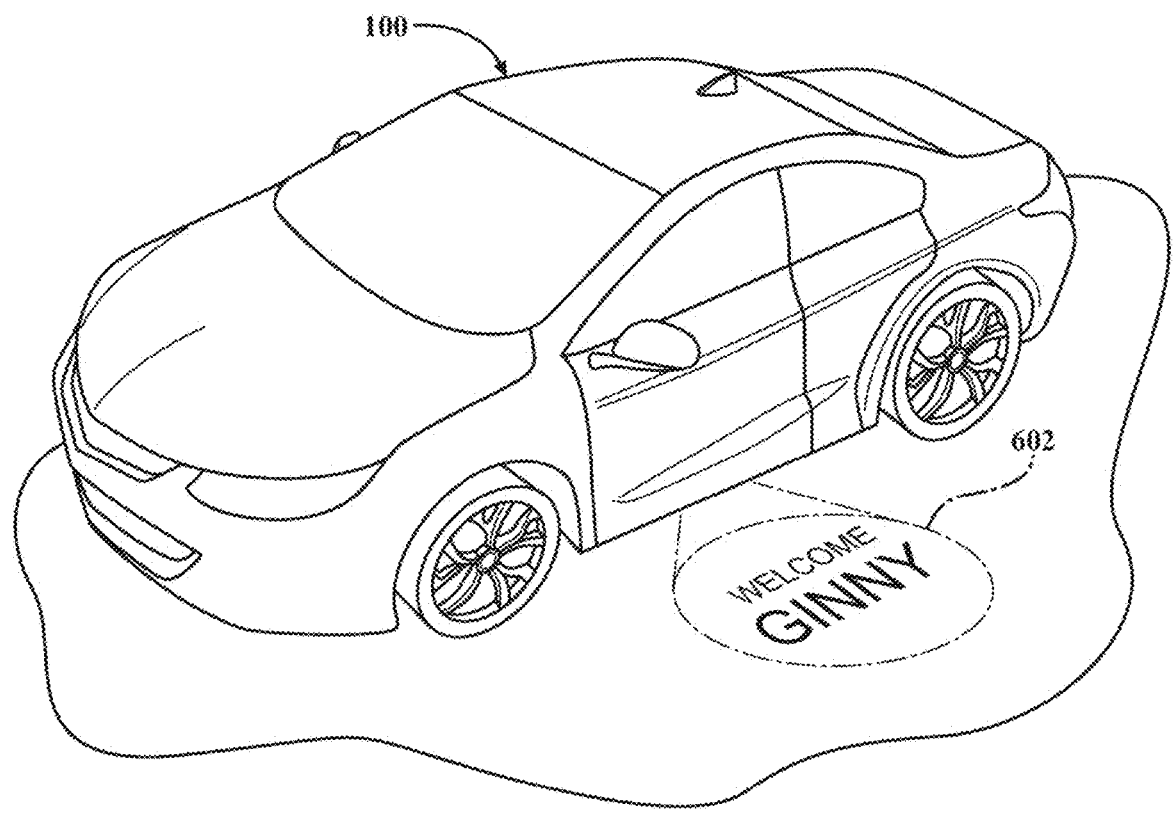
FIG. 6 is a perspective view of the vehicle with a welcome message projected onto a ground surface along a side of the vehicle.

Optionally, determining presence of the user device 10 within the second zone 112 may cause the vehicle to initiate a second stage of a welcome sequence. For example, a graphical image 502 may be projected onto a window 102 of the vehicle 100 or displayed at a display screen at or near the window 102 of the vehicle 100 to provide a welcome message (FIG. 5). In some examples, a graphical image or carpet lighting 602 may be projected onto a ground surface at a side of the vehicle 100 to provide the welcome message (FIG. 6).

Figure 7:
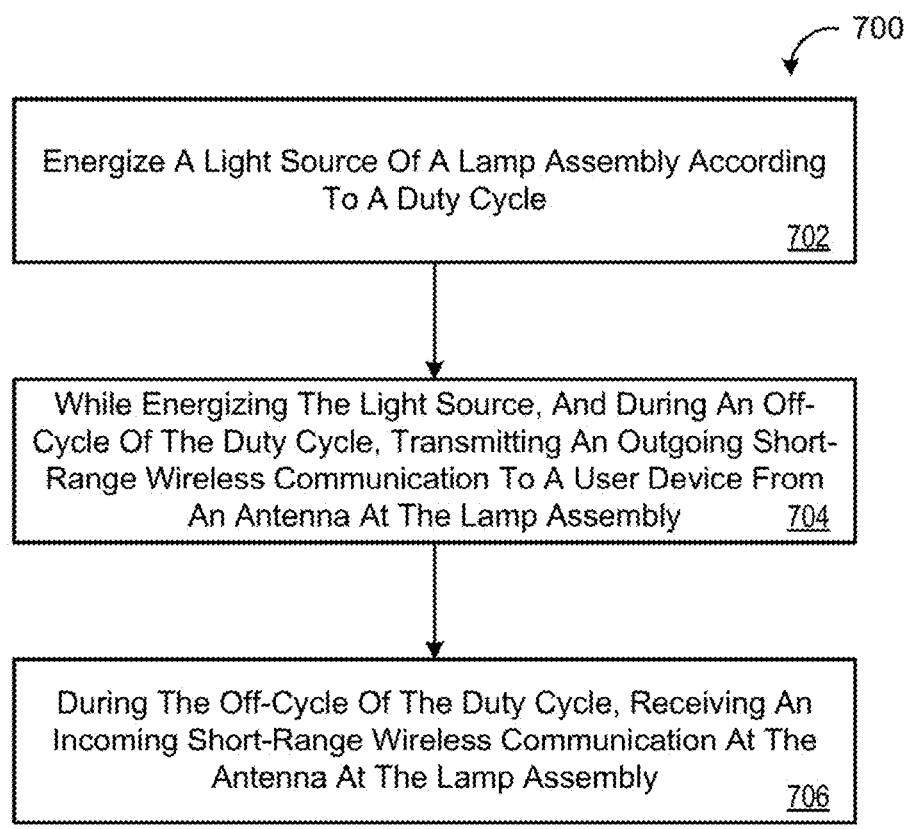
FIG. 7 is a flowchart of an example method of controlling operation of the light source and the antenna at the lamp assembly.

FIG. 7 provides a flowchart of an example arrangement of operations for a method 700 of controlling operation of the light source 202 and the UWB antenna 214 at the lamp assembly 200. The data processing hardware of the control module 318 may execute instructions stored on the memory storage to cause the data processing hardware to perform the operations for the method 700. At operation 702, the method 700 includes energizing a light source 202 of a vehicular lamp assembly 200 according to a duty cycle 322. The light source 202 emits light responsive to being energized. The method 700 includes at operation 704, while energizing the light source 202, and during an off-cycle 326 of the duty cycle 322, transmitting an outgoing short-range wireless communication 402 to a user device 10. The outgoing short-range wireless communication 402 is transmitted from an antenna 214 at the lamp assembly 200. At operation 706, the method 700 includes, during the off-cycle 326 of the duty cycle 322, receiving an incoming short-range wireless communication 404 at the antenna 214 at the lamp assembly 200. The incoming short-range wireless communication 404 is transmitted from the user device 10 responsive to the outgoing short-range wireless communication 402.

Figure 8:
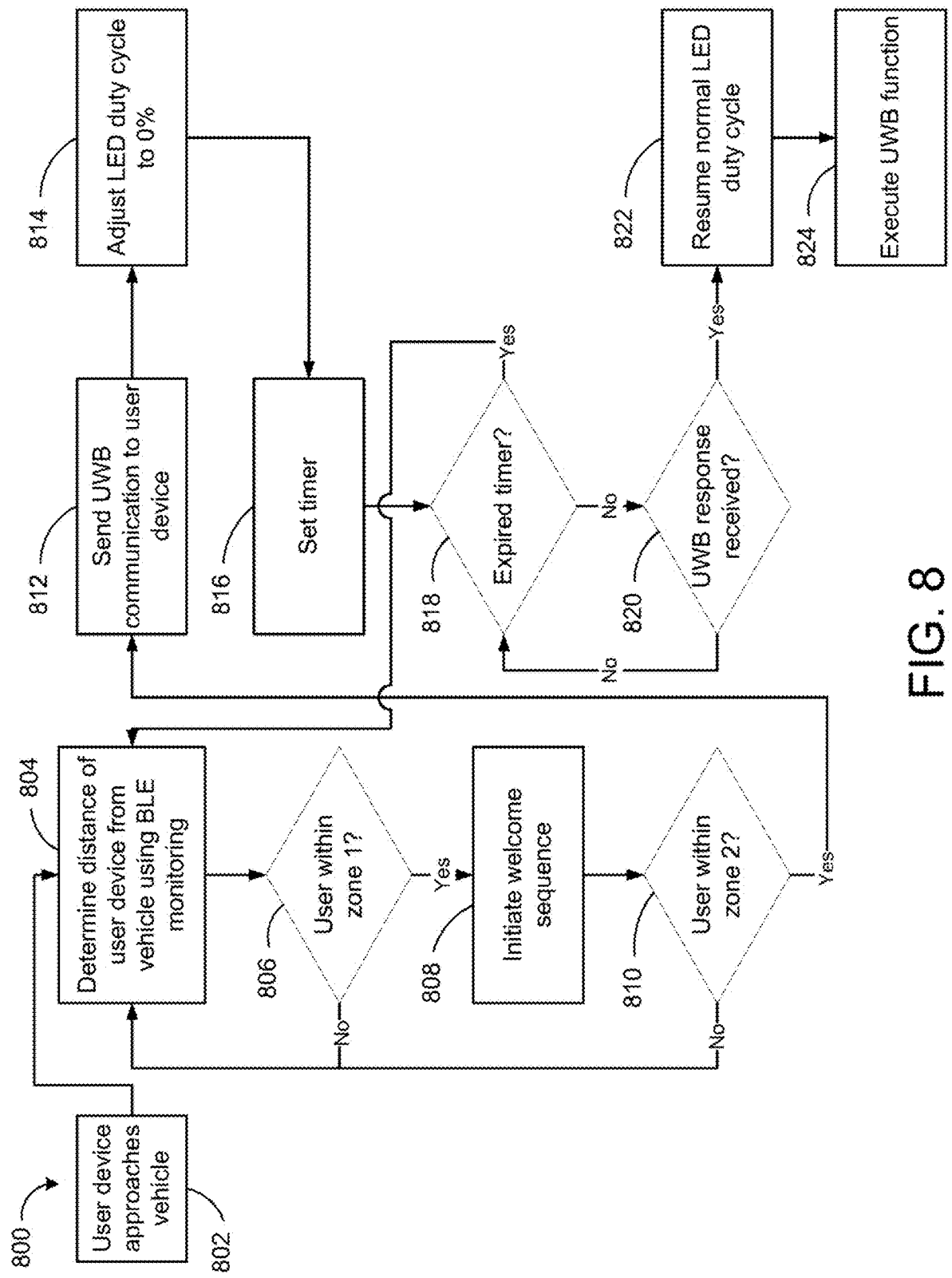
FIG. 8 is a flowchart of another example method of controlling operation of the light source and the antenna at the lamp assembly.

FIG. 8 provides a flowchart of an example arrangement of operations for another method 800 of controlling operation of the light source 202 and the UWB antenna 214 at the lamp assembly 200. The data processing hardware of the control module 318 may execute instructions stored on the memory storage to cause the data processing hardware to perform the operations for the method 800. At operation 802, the method 800 is initiated as the user device 10 approaches the vehicle 100. At operation 804, the method 800 includes determining a distance of the user device 10 from the vehicle 100. During operation 804, the method 800 may determine the distance of the user device 10 from the vehicle 100 via short-range wireless communications using a first protocol (e.g., BLE). Using a first short-range wireless communication protocol such as BLE has a low power consumption compared to UWB, but also provides lower accuracy and communication speed. At operation 806, the method 800 includes determining whether the user device 10 is within a first zone or first threshold distance 110 from the vehicle 100. If the user device 10 is not within the first threshold distance 110 from the vehicle 100, the method 800 continues to determine the distance of the user device 10 from the vehicle 100 using the first short-range wireless communication protocol. If the user device 10 is within the first threshold distance 110 from the vehicle 100, the method 800 at operation 808 initiates a welcome sequence, such as by energizing the light source 202 at the lamp assembly 200. At operation 810, the method 800 includes determining whether the user device 10 is within a second zone or second threshold distance 112 from the vehicle 100 that is less than the first threshold distance 110. During operation 810, the method 800 may determine the distance of the user device 10 from the vehicle 100 via short-range wireless communications using the first protocol. If the user device 10 is not within the second threshold distance 112 from the vehicle 100, the method 800 continues to determine the distance of the user device 10 from the vehicle 100 using the first short-range wireless communication protocol. If the user device 10 is within the second threshold distance 112 from the vehicle 100, the method 800 at operation 812, transmits an outgoing short-range wireless communication 402 to the user device 10 using the second short-range wireless communication protocol (e.g., UWB).

In other words, the method 800 at operation 812 includes, while energizing the light source 202, transmitting the outgoing short-range wireless communication 402 to the user device 10. The outgoing short-range wireless communication 402 is transmitted from the antenna 214 at the vehicular lamp assembly 200. As shown at operation 814, the method 800 includes adjusting the duty cycle 322 energizing the light source 202 to a zero (0)) percent duty cycle 322, such as utilizing a PWM hold signal 328, so that the outgoing short-range wireless communication 402 is transmitted to the user device 10 during an off-cycle 326 and/or the PWM hold 328 of the duty cycle 322. The zero (0)) percent duty cycle 322 will not cause a noticeable interruption in illumination.

At operation 816, the method 800 includes setting a timer to track response time from the user device 10. For example, the timer may be set based on the length of the off-cycle 326 and/or the PWM hold 328 of the duty cycle 322 so that a return signal from the user device 10 can be received during the off-cycle 326 and/or the PWM hold 328 of the duty cycle 322. At operation 818, the method 800 determines whether the time has expired. If the timer has expired, the method 800 may adjust the duty cycle 322 to the normal duty cycle 322 for energizing the LED 202, such as by removing the PWM hold 328, and the method 800 returns to step 804 and continues to determine the distance of the user device 10 from the vehicle 100 using the first short-range wireless communication protocol. If the time has not expired, the method 800 at operation 820 determines whether an incoming short-range wireless communication 404 has been received from the user device 10. The incoming short-range wireless communication 404 is received from the user device 10 at the antenna 214 at the lamp assembly 200. If the incoming short-range wireless communication 404 is not received, the method 800 returns to step 818 until the timer expires or the incoming short-range wireless communication 404 is received. If the incoming short-range wireless communication 404 is received, the method 800 at operation 822 adjusts the duty cycle 322 to the normal duty cycle 322 for energizing the LED 202, such as by removing the PWM hold 328. At operation 824, the method 800 includes executing a function of the vehicle 100 based on the UWB communications and/or the proximity of the user device 10 to the vehicle 100, such as executing a digital key or keyless entry function for unlocking the vehicle, generating a welcome image 502 at the window 102 of the vehicle 100, generating a welcome image 602 at the ground at or near the vehicle 100, and the like.

Thus, the lamp assembly 200 with short-range wireless communication antenna 214 provides an exterior lighting lamp assembly 200 capable of UWB communication using the antenna 214 installed at the lamp assembly 200 without EMI effects. The UWB antenna 214 is integrated with the reflector 210 or light guide 208 or circuit element 204 at the lamp assembly 200 at each corner region of the vehicle 100 for optimal communication performance that is EMI free for the antenna 214. The duty cycle 322 energizing the LEDs 202 is controlled so that the UWB outgoing communication signal 402 is generated during an off-cycle 326 of the PWM duty cycle 322 to prevent EMI issues for the communication. Further, the vehicle 100 may include a monitoring system that utilizes BLE to initiate the welcome lighting at the vehicle 100 when the user device 10 is determined to be at a first distance 110 from the vehicle 100. UWB communication is initiated during illumination of the light sources 202 and when the user device 10 is determined to be at a second distance 112 from the vehicle 100.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer implemented method executed by data processing hardware that causes the data processing hardware to perform operations comprising:
   energizing a light source of a vehicular lamp assembly according to a duty cycle, the light source emitting light responsive to being energized;
   while energizing the light source, and during an off-cycle of the duty cycle, transmitting an outgoing short-range wireless communication to a user device, the outgoing short-range wireless communication transmitted from an antenna at the vehicular lamp assembly; and
   during the off-cycle of the duty cycle, receiving an incoming short-range wireless communication at the antenna at the vehicular lamp assembly, the incoming short-range wireless communication transmitted from the user device responsive to the outgoing short-range wireless communication.

2. The method of claim 1, wherein:
   the operations further comprise, while energizing the light source, adjusting the duty cycle from a first duty cycle to a zero (0) percent duty cycle; and
   transmitting the first short-range wireless communication and receiving the second short-range wireless communication occurs during the zero (0) percent duty cycle of the duty cycle.

3. The method of claim 2, wherein the operations further comprise, responsive to receiving the incoming short-range wireless communication, adjusting the duty cycle to the first duty cycle.

4. The method of claim 1, wherein energizing the light source of the vehicular lamp assembly is responsive to determining presence of the user device at a distance from the vehicular lamp assembly that is less than a first threshold distance.

5. The method of claim 4, wherein transmitting the outgoing short-range wireless communication to the user device is responsive to determining presence of the user device at a distance from the vehicular lamp assembly that is less than a second threshold distance, the second threshold distance less than the first threshold distance.

6. The method of claim 1, wherein the light source comprises a light emitting diode (LED) disposed on a circuit element.

7. The method of claim 6, wherein the antenna is disposed on the circuit element.

8. The method of claim 1, wherein the antenna comprises a conductive trace disposed at one selected from the group consisting of:
 a light guide of the vehicular lamp assembly;
 a reflector of the vehicular lamp assembly;
 a housing of the vehicular lamp assembly; and
 a bezel of the vehicular lamp assembly.

9. The method of claim 8, wherein at least a portion of the conductive trace forms a graphical design at the light guide or the reflector of the vehicular lamp assembly.

10. The method of claim 1, wherein the outgoing short-range wireless communication and the incoming short-range wireless communication comprise ultra-wideband (UWB) communications.

11. A system, the system comprising:
 data processing hardware; and
 memory hardware in communication with the data processing hardware, the memory hardware storing instructions executed on the data processing hardware that cause the data processing hardware to perform operations comprising:
  energizing a light source of a vehicular lamp assembly according to a duty cycle, the light source emitting light responsive to being energized;
  while energizing the light source, and during an off-cycle of the duty cycle, transmitting an outgoing short-range wireless communication to a user device, the outgoing short-range wireless communication transmitted from an antenna at the vehicular lamp assembly; and
  during the off-cycle of the duty cycle, receiving an incoming short-range wireless communication at the antenna at the vehicular lamp assembly, the incoming short-range wireless communication transmitted from the user device responsive to the outgoing short-range wireless communication.

12. The system of claim 11, wherein:
the operations further comprise, while energizing the light source, adjusting the duty cycle from a first duty cycle to a zero (0) percent duty cycle; and
transmitting the first short-range wireless communication and receiving the second short-range wireless communication occurs during the zero (0) percent duty cycle of the duty cycle.

13. The system of claim 11, wherein:
energizing the light source of the vehicular lamp assembly is responsive to determining presence of the user device at a distance from the vehicular lamp assembly that is less than a first threshold distance; and
transmitting the outgoing short-range wireless communication to the user device is responsive to determining presence of the user device at a distance from the vehicular lamp assembly that is less than a second threshold distance, the second threshold distance less than the first threshold distance.

14. The system of claim 11, wherein the light source comprises a light emitting diode (LED) disposed on a circuit element, the antenna disposed on the circuit element.

15. The system of claim 11, wherein the antenna comprises a conductive trace disposed at one selected from the group consisting of:
 a light guide of the vehicular lamp assembly;
 a reflector of the vehicular lamp assembly;
 a housing of the vehicular lamp assembly; and
 a bezel of the vehicular lamp assembly.

16. The system of claim 11, wherein the outgoing short-range wireless communication and the incoming short-range wireless communication comprise ultra-wideband (UWB) communications.

17. A vehicle, the vehicle comprising:
 a lamp assembly comprising:
  a light source including a light emitting diode (LED) disposed on a circuit element;
  a light guide; and
  a reflector;
 data processing hardware disposed at the lamp assembly; and
 memory hardware in communication with the data processing hardware, the memory hardware storing instructions executed on the data processing hardware that cause the data processing hardware to perform operations comprising:
  energizing the light source of the lamp assembly according to a duty cycle, the light source emitting light responsive to being energized;
  while energizing the light source, and during an off-cycle of the duty cycle, transmitting an outgoing ultra-wideband (UWB) wireless communication to a user device, the outgoing UWB wireless communication transmitted from an antenna at the lamp assembly; and
  during the off-cycle of the duty cycle, receiving an incoming UWB wireless communication at the antenna at the lamp assembly, the incoming UWB wireless communication transmitted from the user device responsive to the outgoing UWB wireless communication.

18. The vehicle of claim 17, wherein:
the operations further comprise, while energizing the light source, adjusting the duty cycle from a first duty cycle to a zero (0) percent duty cycle; and
transmitting the first UWB wireless communication and receiving the second UWB wireless communication occurs during the zero (0) percent duty cycle of the duty cycle.

19. The vehicle of claim 17, wherein:
energizing the light source of the lamp assembly is responsive to determining presence of the user device at a distance from the vehicle that is less than a first threshold distance; and
transmitting the outgoing UWB wireless communication to the user device is responsive to determining presence of the user device at a distance from the vehicle that is less than a second threshold distance, the second threshold distance less than the first threshold distance.

20. The vehicle of claim 17, wherein the antenna comprises a conductive trace disposed at one selected from the group consisting of:
the circuit element;
the light guide;
the reflector,
a housing of the lamp assembly; and
a bezel of the lamp assembly.

\* \* \* \* \*